US006832837B2

(12) United States Patent
Suzuki et al.

(10) Patent No.: US 6,832,837 B2
(45) Date of Patent: Dec. 21, 2004

(54) PROJECTION DISPLAY DEVICE AND AIR BLOWING DEVICE

(75) Inventors: Shingo Suzuki, Ome (JP); Hideo Kanai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/629,916

(22) Filed: Jul. 30, 2003

(65) Prior Publication Data

US 2004/0075818 A1 Apr. 22, 2004

(30) Foreign Application Priority Data

Jul. 30, 2002 (JP) ........................................ 2002-221836

(51) Int. Cl.⁷ ......................... G03B 21/18; G03B 21/26; G03B 21/22; G02F 1/1335
(52) U.S. Cl. ............................. 353/61; 353/60; 353/57; 353/119; 349/5; 349/8
(58) Field of Search ............................... 353/57, 60, 61, 353/119; 349/5, 6, 7, 8, 9; 352/202, 146; 362/294

(56) References Cited

U.S. PATENT DOCUMENTS 5,676,442 A   10/1997  Fujimori ..................... 353/119
6,132,049 A   10/2000  Yamaguchi et al. .......... 353/61
6,280,038 B1   8/2001  Fuse et al. .................... 353/57
6,334,686 B1   1/2002  Shiraishi et al. .............. 353/57
6,422,703 B1 *  7/2002  Wang et al. .................. 353/61
6,497,489 B1 * 12/2002  Li et al. ........................ 353/61
6,572,231 B1   6/2003  Watanabe ..................... 353/58
6,633,349 B2 * 10/2003  Fujishiro ...................... 349/58
6,641,267 B2 * 11/2003  Ohishi et al. ................. 353/61
6,736,513 B2 *  5/2004  Koyama et al. .............. 353/31

FOREIGN PATENT DOCUMENTS

DE   199 59 257 A1   7/2000   .......... G03B/21/16
JP   11-82393          3/1999   .......... F04D/29/54

* cited by examiner

Primary Examiner—Judy Nguyen
Assistant Examiner—Melissa J Koval
(74) Attorney, Agent, or Firm—Pillsbury Winthrop LLP

(57) ABSTRACT

A projection display device comprises a light source, a display section configured to receive light from the light source and output image light modulated with an image signal, a projection device configured to project the image light output from the display section, a duct device having an air duct for conducting air from an air intake to an air discharge section and an air chamber which is formed downstream of the air discharge section in the air duct and configured to blow cooling air from the air discharge section toward the display section, and an air blower configured to blow cooling air into the air intake.

10 Claims, 5 Drawing Sheets

PROJECTION DISPLAY DEVICE AND AIR BLOWING DEVICE

CROSS-REFERENCE TO RELATED APPLICATIONS

This application is based upon and claims the benefit of priority from the prior Japanese Patent Application No. 2002-221836, filed Jul. 30, 2002, the entire contents of which are incorporated herein by reference.

BACKGROUND OF THE INVENTION

1. Field of the Invention

The present invention relates to a projection display device which projects optical images onto a screen for image reproduction and more specifically to improvements in means for cooling light bulbs used in the display device. Also, the present invention relates to improvements in air blowing device suitably used to cool the light bulbs of a projection display device such as a liquid crystal projector.

2. Description of the Related Art

As is well known, information terminals for home use, such as personal computers, have come into wide use in recent years. Moreover, high-definition television has also started. Under these circumstances, the demand has increased for reproducing images on a larger screen with higher brightness and quality.

To meet such a demand, the development of projection display devices, such as liquid crystal projectors, is accelerated at present. In the projection display device, light from a light source is decomposed into three primary color components of red (R), green (G) and blue (B) and each colored light is then directed onto a corresponding one of the liquid crystal light panels.

Each of these light panels is driven by a respective one of the R, G and B image signals to produce image light modulated by the image signal. The rays of image light output from the liquid crystal light panels are combined and then enlargement projected through a projection lens onto a screen for image reproduction.

In this type of projection display device, as its light source use is frequently made of a lamp of high power dissipation, such as a metal halide lamp or extra-high pressure mercury lamp. For this reason, it is required to make provisions not only for cooling the interior of the device or cooling for increasing the life of the lamp itself but also for cooling the interior of the optical engine.

The cooling of the interior of the optical engine is performed mainly on polarization conversation elements, input and output polarizing plates, and the liquid crystal light panels. In many cases, these parts, unlike lenses and mirrors, are not composed of inorganic materials only. When the parts rise in temperature, not only is their life shortened, but also the performance required of them as products cannot be maintained.

The parts inside the optical engine are required to allow incoming light to pass through. For this reason, with a cooling method using heatsinks, it is impossible to secure a large contact area, thus reducing the cooling efficiency. Thus, forced-air cooling using air blowers (fans) is generally adopted.

At present, with reduction in dimensions of projection display devices and increase in the luminance, downsizing of optical parts and increasing of the output power of light sources are in progress. Under these circumstances, cooling of the input and output polarizing plates and the liquid crystal light bulbs in particular has become further difficult.

As provisions for cooling, various methods have been developed which include a method which uses a centrifugal fan with higher static pressure in place of an axial fan, a method which uses a material of high heat transfer rate for the glass that is used for lamination of polarizing plates, and a method which uses a material of high heat transfer rate for a frame that holds a liquid crystal light bulb.

To lower the temperature of parts to be cooled, the speed of the fan is simply increased to increase the quantity of air, in which case noise involved in increasing the quantity of air will become a problem. For this reason, the important issue is how to lower ventilation resistance associated with the paths from the fan to the input and output polarizing plates and the liquid crystal light bulbs.

Ideally, it is the most effective to apply air directly from the fan to the parts to be cooled without providing air ducts. In practice, however, structural restrictions resulting from downsizing of the device frequently cause it to have to take the configuration in which airflow is conducted from the fan through air ducts to the parts to be cooled.

In this case, if the air duct is bent, there will be produced nonuniformity in the quantity of air finally blown out of the outlet of the air duct. For this reason, the input and output polarizing plates and the liquid crystal light panel will each have sufficiently cooled portions and insufficiently cooled portions. This has an adverse effect on the quality of a displayed image.

To cope with this problem, for example, Jpn. Pat. Appln. KOKAI Publication No. 11-82393 discloses a configuration which causes a fan to take in air uniformly therethrough to thereby allow the quantity of air sent out by the fan to become uniform.

With this disclosed configuration, however, it is required to blow air directly from the fan onto the parts to be cooled. This makes it necessary to place the fan in the proximity of the input and output polarizing plates and the liquid crystal light panel. The configuration is therefore not suited for use with projection display devices with downsizing requirements.

BRIEF SUMMARY OF THE INVENTION

According to an aspect of the present invention, there is provided a projection display device comprising: a light source, a display section configured to receive light from the light source and output image light modulated with an image signal; a projection device configured to project the image light output from the display section; a duct device having an air duct for conducting air from an air intake to an air discharge section and an air chamber which is formed downstream of the air discharge section in the air duct and configured such that cooling air blows from the air discharge section toward the display section; and an air blower configured to blow cooling air into the air intake.

According to another aspect of the present invention, there is provided an air blowing device which blows cooling air against a part to be cooled comprising: a duct device having an air duct for conducting air from an air intake to an air discharge section and an air chamber formed downstream of the air discharge section in the air duct and configured to blow cooling air from the air discharge section toward the part to be cooled; and an air blower configured to blow cooling air into the air intake.

DETAILED DESCRIPTION OF THE INVENTION

Figure 1:
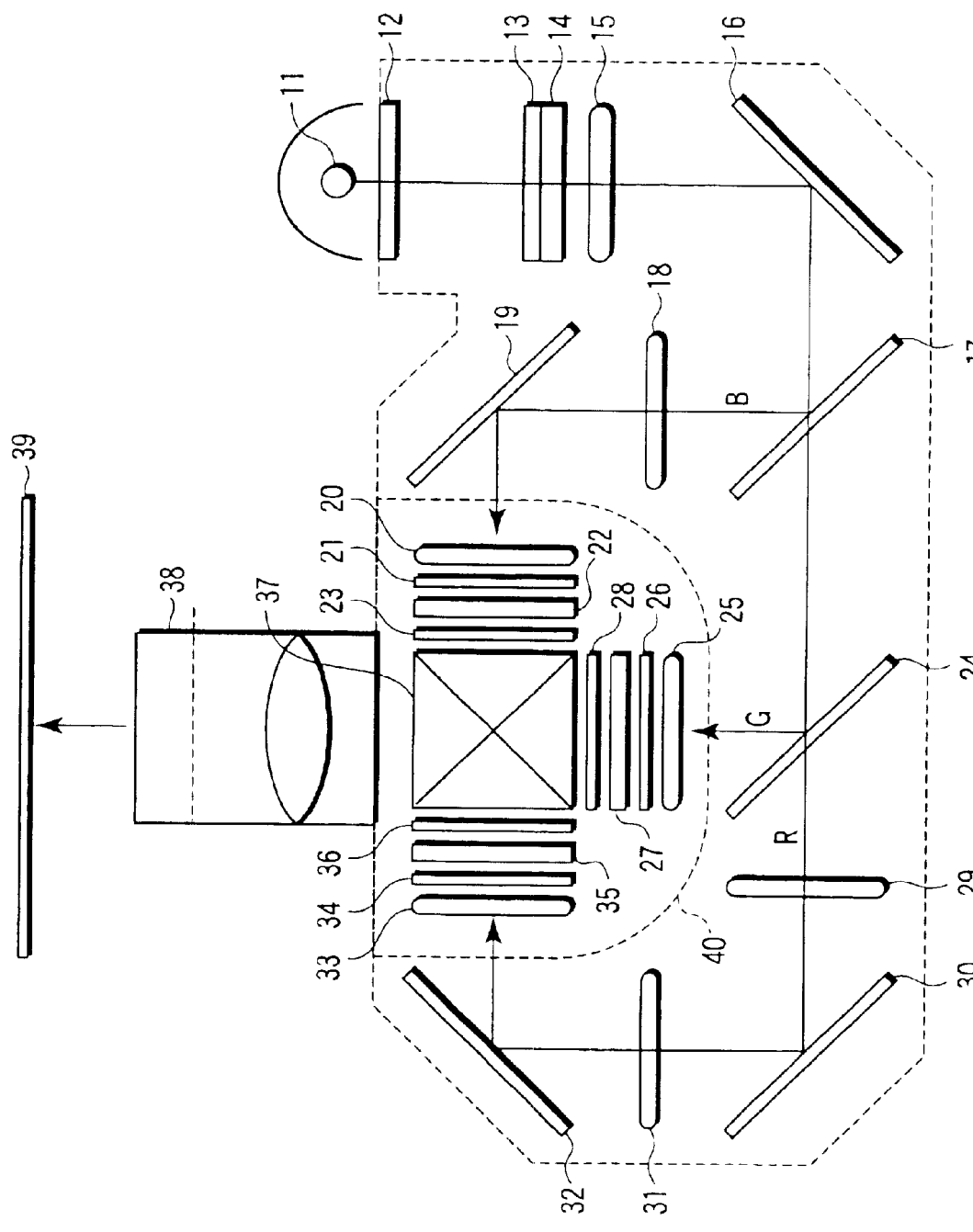
FIG. 1 is a diagram for use in explanation of an optical engine system for use in a projection display device according to an embodiment of the present invention.

A projection display device according to an embodiment of the present invention will be described in detail below with reference to the accompanying drawings. FIG. 1 is a schematic diagram of the projection display device and illustrates its optical engine system in particular.

In FIG. 1, reference numeral 11 denotes a light source. The light emitted from the light source 11 is converted by multiple lenses 12 and 13 into parallel rays of light, then passes through a polarization conversion element 14 and a condenser lens 15 and is reflected at substantially right angles by a reflecting mirror 16.

The light reflected by the reflecting mirror 16 is directed onto a dichroic mirror 17 that reflects blue light. The blue light is directed through a condenser lens 18, a reflecting mirror 19, a field lens 20, and an input polarizing plate 21 onto a liquid crystal light bulb panel 22.

The liquid crystal light panel 22 has an image display screen driven by a blue image signal. By being irradiated with the blue light, the liquid crystal light panel 22 outputs image light modulated with the blue image signal, which in turn falls on an output polarizing plate 23.

Other colors of light than the blue light pass through the dichroic mirror 17 and are then directed onto a dichroic mirror 24 that reflects green light. The reflected green light is directed through a field lens 25 and an input polarizing plate 26 onto a liquid crystal light panel 27.

The liquid crystal light bulb panel 27 has an image display screen driven by a green image signal. By being irradiated with the green light, the liquid crystal light bulb panel 27 outputs image light modulated with the green image signal, which in turn falls on an output polarizing plate 28.

The red light passed through the dichroic mirror 24 has its direction of propagation changed by a relay lens 29, a reflecting mirror 30, a relay lens 31, and a reflecting mirror 32 and is then directed through a field lens 33 and an input polarizing plate 34 onto a liquid crystal light panel 35.

The liquid crystal light panel 35 has an image display screen driven by a red image signal. By being irradiated with the red light, the liquid crystal light panel 35 outputs image light modulated with the red image signal, which in turn falls on an output polarizing plate 36.

The blue, green and red image light outputs of the respective liquid crystal light panels 22, 27, and 35 are combined by a combining prism 37 and then projected through a projection lens 38 onto a screen 39. Thereby, image reproduction is achieved.

Figure 2A:
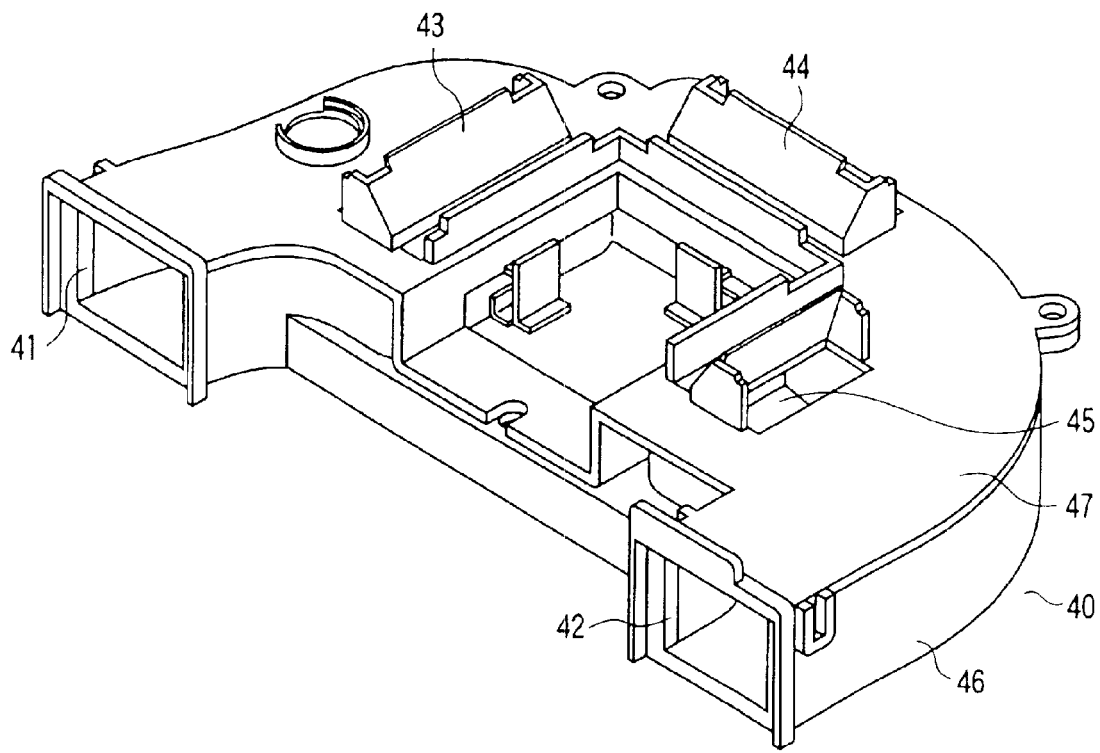
FIGS. 2A and 2B are perspective views for use in explanation of a duct device used in the projection display device of the embodiment of the present invention.

FIG. 2A shows the appearance of a duct device 40 for air cooling the input polarizing plates 21, 26 and 34, the liquid crystal light panels 22, 27 and 35, and the output polarizing plates 23, 28 and 36. The duct device 40, which, as a whole, is shaped like the letter U, has air intakes 41 and 42 formed at its both ends.

Also, the duct device 40 is formed in its central portion with an air discharge section 43 for blowing air against the input polarizing plate 21, the liquid crystal light panel 22, and the output polarizing plate 23, an air discharge section 44 for blowing air against the input polarizing plate 26, the liquid crystal light panel 27, and the output polarizing plate 28, and an air discharge section 45 for blowing air against the input polarizing 34, the liquid crystal light bulb 35, and the output polarizing plate 36.

Figure 2B:
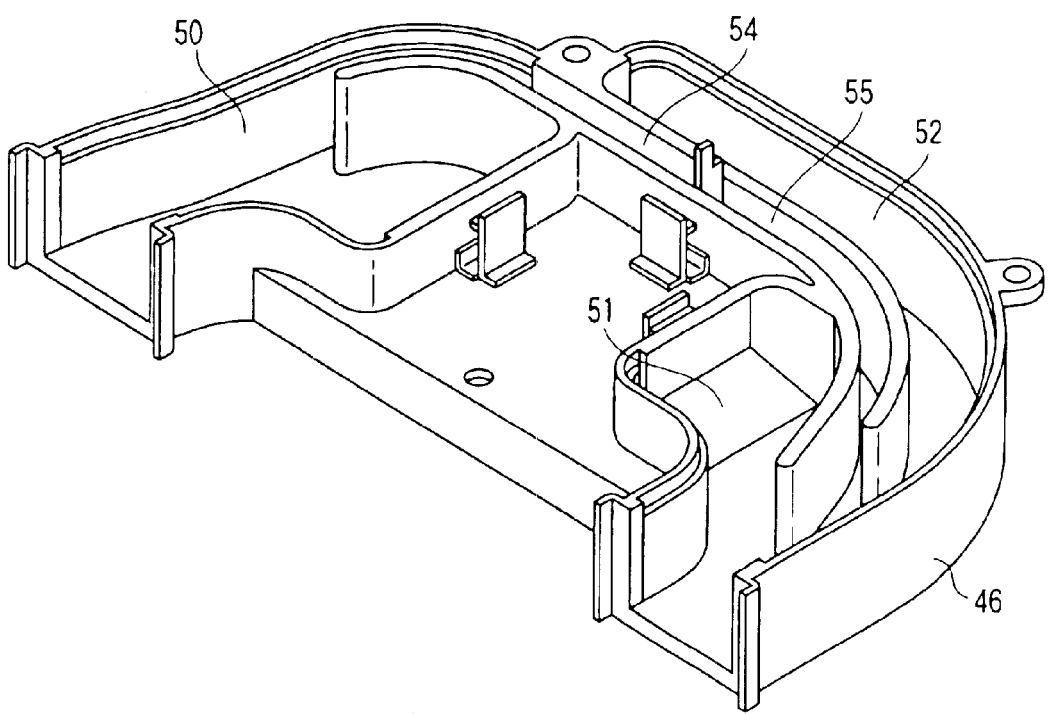

The duct device 40 is configured such that a cover 47 is integrated with the duct body 46. The duct body 46 is formed inside with a plurality of air ducts 50, 51, 52, 54 and 54, as shown in FIG. 2B, so as to conduct air taken in from the air intakes 41 and 42, shown in FIG. 2A, to the air discharge section 43, 44 and 45, shown in FIG. 2B.

Figure 3A:
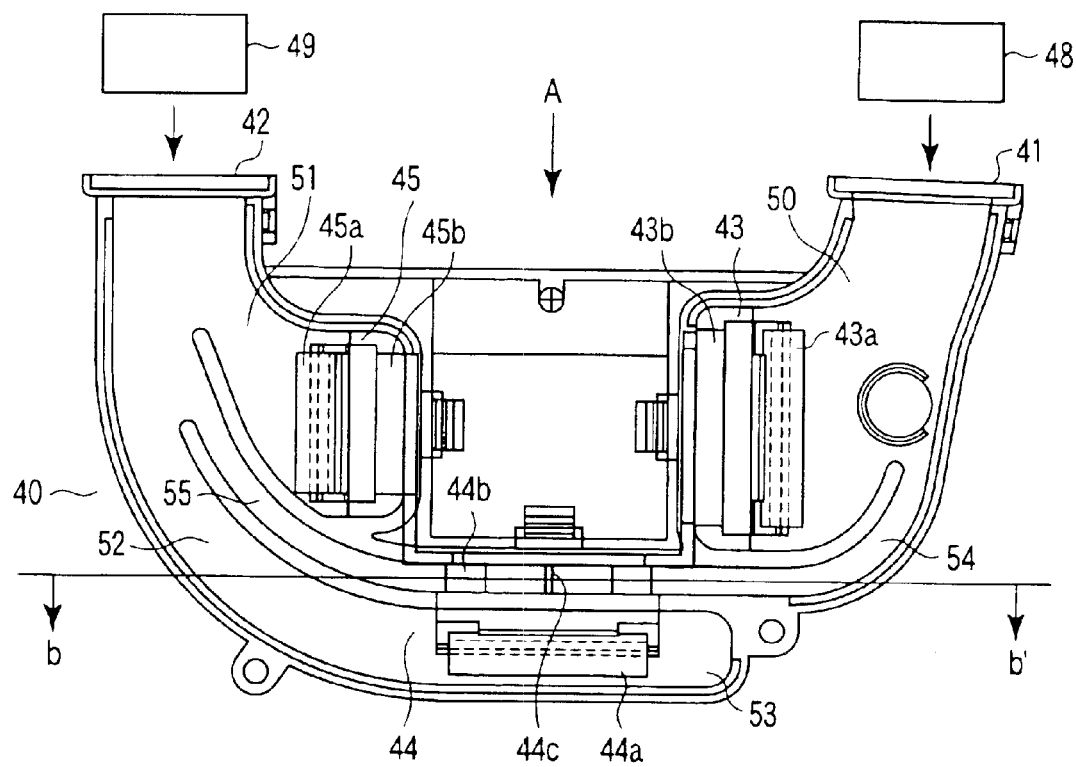
FIGS. 3A and 3B are diagrams for use in explanation of the detailed structure of the duct device of FIGS. 2A and 2B.
Figure 3B:
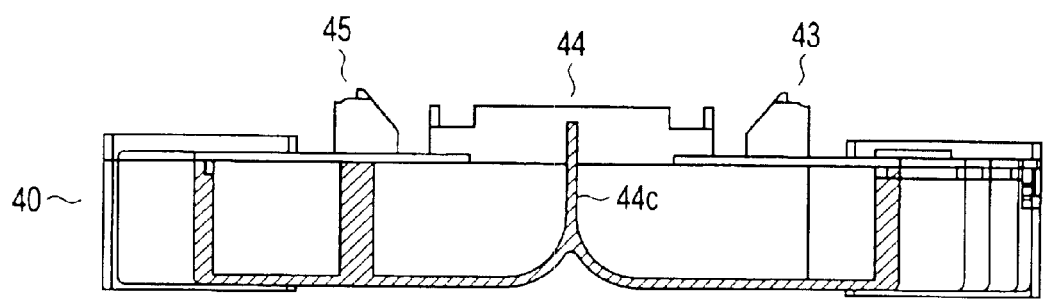

FIGS. 3A and 3B show the air ducts in the duct device 40. FIG. 3B is a sectional view taken along line b—b' in FIG. 3A. Centrifugal fans 48 and 49 are placed in front of the air intakes 41 and 42, respectively, of the duct device 40. Air blown from the centrifugal fan 48 enters the duct device 40 through the air intake 41 and is then discharged from the air discharge section 43 through the air duct 50.

The air discharge section 43 is composed of an input-side outlet 43a and an output-side outlet 43b. The input-side outlet 43a is adapted to discharge air to the input polarizing plate 21, shown in FIG. 1, and the input side of the liquid crystal light panel 22 shown in FIG. 1, for cooling thereof. The output-side outlet 43b is adapted to discharge air to the output side of the liquid crystal light panel 22 and the output polarizing plate 23, shown in FIG. 1, for cooling thereof.

Air blown from the centrifugal fan 49 enters the duct device 40 through the air intake 42 and is then discharged from the air discharge section 45 through the air duct 51. The air discharge section 45 is composed of an input-side outlet 45a and an output-side outlet 45b. The input-side outlet 45a is adapted to discharge air to the input polarizing plate 34 shown in FIG. 1, and the input side of the liquid crystal light bulb 35, shown in FIG. 1, for cooling thereof. The output-side outlet 45b is adapted to discharge air to the output side of the liquid crystal light panel 35 and the output polarizing plate 36, shown in FIG. 1, for cooling thereof.

The air discharge section 44 is composed of an input-side outlet 44a and an output-side outlet 44b. Air blown from the centrifugal fan 49 enters the duct device 40 through the air intake 42 and is then discharged from the input-side outlet 44a through the air duct 52. The input-side outlet 44a is adapted to discharge air to the input polarizing plate 26, shown in FIG. 1, and the input side of the liquid crystal light panel 27, shown in FIG. 1, for cooling thereof.

The air duct 52 is formed with a chamber 53 where air collects, downstream of the input-side outlet 44a. The input-side outlet 44a is formed substantially in parallel with the corresponding air duct 52. Without the chamber 53, therefore, there will be produced a difference in the quantity of air discharged from the outlet 44a between its portions near and far from the air intake 42. In that case, air will not be blown uniformly against the display screen of the liquid crystal light panel 27, resulting in nonuniform temperature distribution over the display screen.

For this reason, in this embodiment, the chamber 53 serving as an air reservoir is formed downstream of the input-side outlet 44a. As a result, air is discharged from the outlet 44a substantially uniformly as shown in FIG. 4, thereby allowing the input polarizing plate 26 and the input side of the liquid crystal light panel 27 to be cooled uniformly and efficiently.

Figure 4:
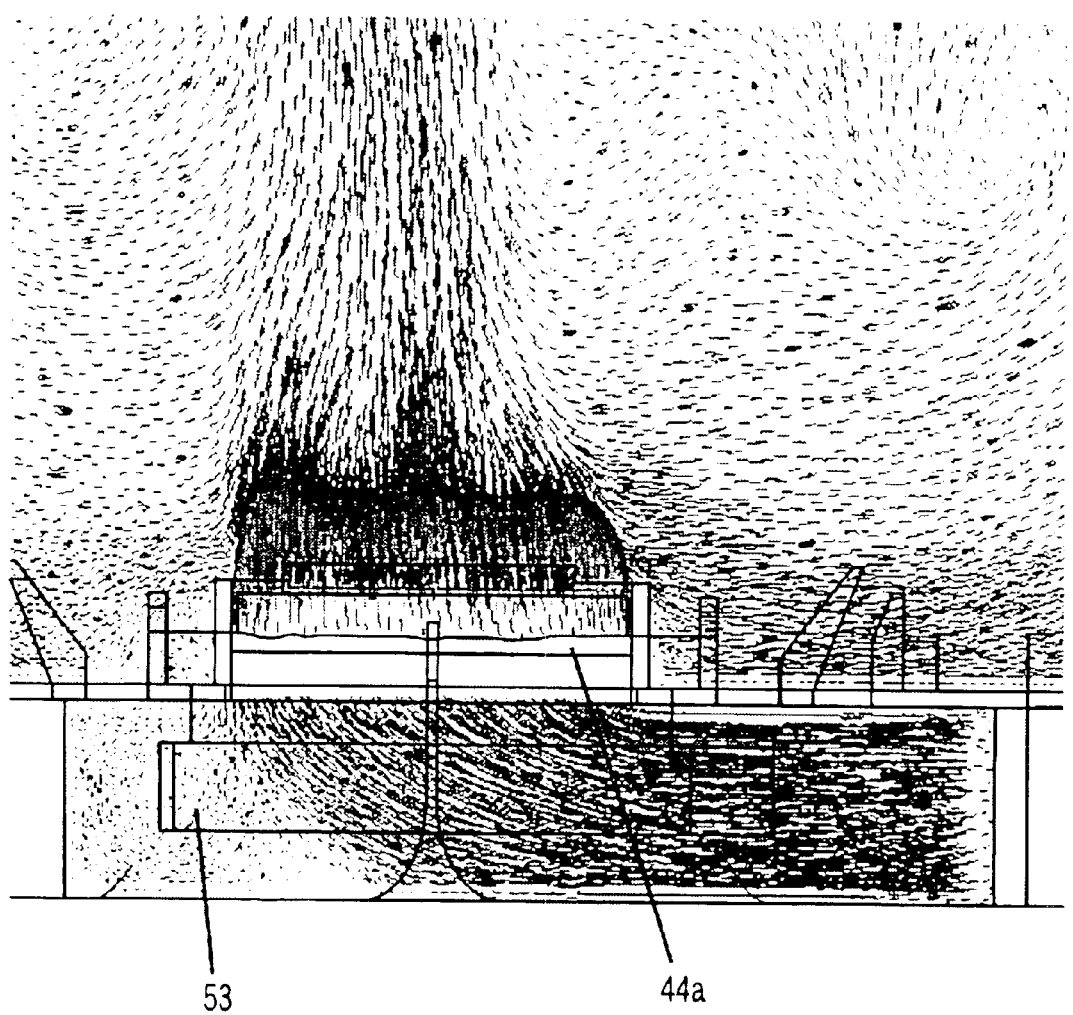
FIG. 4 is a diagram for use in explanation of the distribution of discharged air quantity in the presence of an air chamber in the duct device.

FIG. 4 shows a measurement indicating the discharged state of air from the outlet 44a when viewed in the direction of an arrow A of FIG. 3A. In FIG. 4, the rate of air flow is higher in portions indicated darker.

Referring back to FIGS. 3A and 3B, air from the centrifugal fans 48 and 49 is discharged from the output-side outlet 44b through the air intakes 41 and 42 and the air ducts 54 and 55. The output-side outlet 44b discharges air against the output-side of the liquid crystal light panel 27 and the output polarizing plate 28 for cooling thereof.

Figure 5:
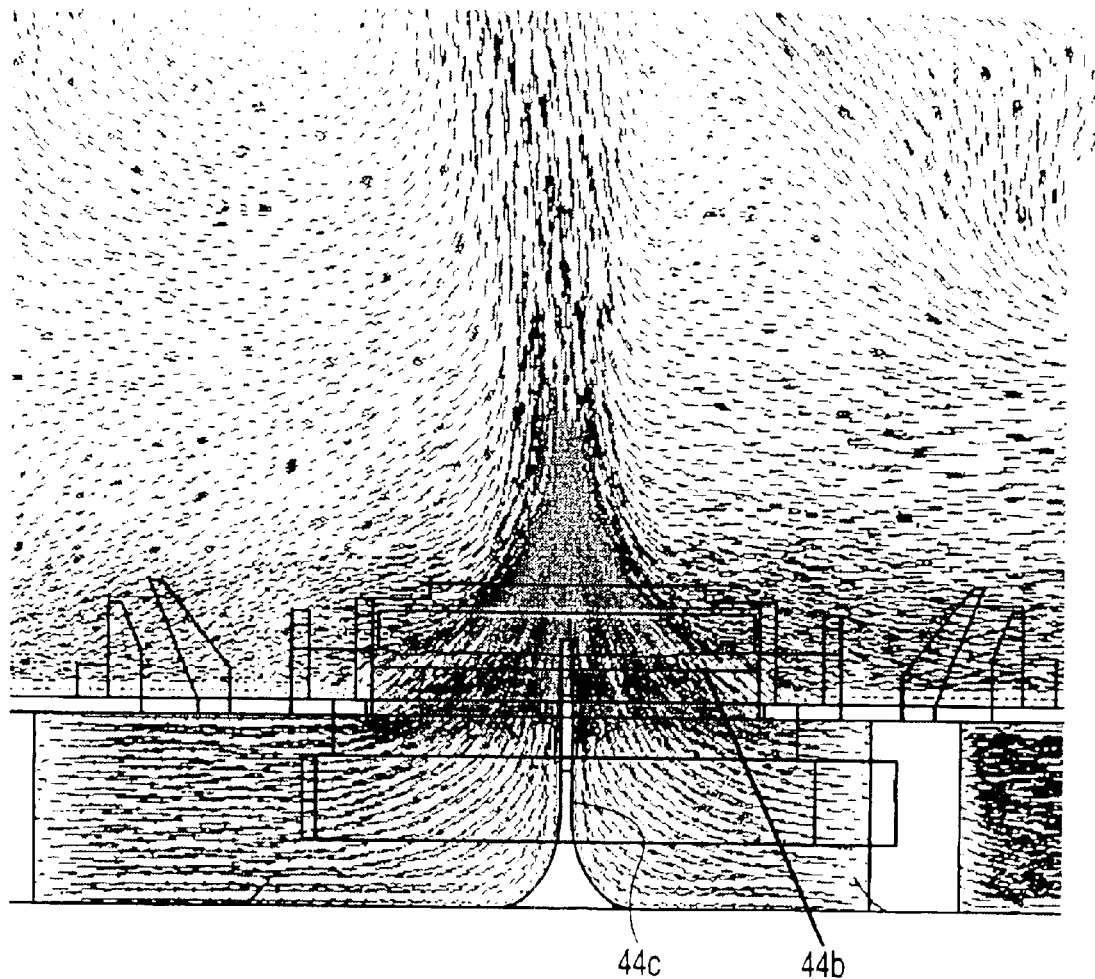
FIG. 5 is a diagram for use in explanation of the distribution of discharged air quantity in the absence of an air chamber in the duct device.

The output-side outlet 44b has a partition plate 44c formed in its central portion. As shown in FIG. 5, therefore, air is discharged from the output-side outlet 44b along the partition plate 44c. The quantity of air discharged from the output-side outlet 44b is the largest in its central portion, cooling the output side of the liquid crystal light bulb panel 27 and the output polarizing plate 28.

According to the embodiment described above, since the air duct 52 that conducts air blown from the centrifugal fan 49 to the input-side outlet 44a has the air chamber 53 formed downstream of that outlet, air can be discharged uniformly from the outlet 44a, which allows the input polarizing plate 26 and the input side of the liquid crystal light panel 27 to be cooled uniformly and efficiently.

The air discharge sections 43 and 45 have no air chamber. This is because the air ducts 50 and 51 are substantially perpendicular to the liquid crystal panels 22 and 35, respectively, and hence air is discharged uniformly from each of the air discharge sections 43 and 45.

Although one embodiment of the present invention has been disclosed and described, the present invention may be practiced or embodied in still other ways without departing from the scope and spirit thereof.

What is claimed is:

1. A projection display device comprising:
    a light source;
    a separation section configured to separate light from the light source into a plurality of primary colors of light;
    a plurality of image display sections each of which is configured to receive a respective one of the primary colors of light and output image light modulated with an image signal corresponding to the respective one of the primary colors of light;
    a projection device configured to combine and project the image light from the display sections;
    a duct device having an air intake, a plurality of air discharge sections, and a plurality of air ducts for conducting air from the air intake to the air discharge sections, at least one of the air ducts having an air chamber formed downstream of the corresponding air discharge section, and configured such that cooling air blows from the air discharge sections toward the display sections, one of the air discharge sections being provided in parallel to the corresponding air duct, and the air chamber being formed downstream of the air discharge section provided in parallel with the corresponding air duct; and
    an air blower configured to blow cooling air into the air intake.

2. A projection display device comprising:
    a light source;
    a separation section configured to separate light from the light source into a plurality of primary colors of light;
    a plurality of image display sections each of which is configured to receive a respective one of the primary colors of light and output image light modulated with an image signal corresponding to the respective one of the primary colors of light;
    a projection device configured to combine and project the image light from the display sections;
    a duct device having an air intake, a plurality of air discharge sections, and a plurality of air ducts for conducting air from the air intake to the air discharge sections, at least one of the air ducts having an air chamber formed downstream of the corresponding air discharge section, and configured such that cooling air blows from the air discharge sections toward the display sections, the air chamber being formed downstream of the air discharge section which is the furthest from the air intake;
    an air blower configured to blow cooling air into the air intake.

3. A projection display device according to claim 1, wherein each of the display sections is a liquid crystal panel.

4. A projection display device according to claim 1, wherein the display sections comprise red, green and blue liquid crystal panels and polarizing plates placed on input and output sides of the respective liquid crystal panel.

5. A projection display device according to claim 1, wherein a plurality of air intakes are provided and the air blower is placed at each of the air intakes.

6. A projection display device according to claim 1, wherein the air blower comprises a centrifugal fan which blows air through the air intake into the air duct.

7. An air blowing device which blows cooling air against a part to be cooled comprising:
    a duct device having an air duct for conducting air from an air intake to an air discharge section and an air chamber formed downstream of the air discharge section in the air duct and configured such that cooling air blows from the air discharge section toward the part to be cooled, one of the air discharge sections in the duct device being provided in parallel with the corresponding air duct, and the air chamber being formed downstream of the air discharge section provided in parallel with the corresponding air duct; and
    an air blower configured to blow cooling air into the air intake.

8. An air blowing device according to claim 7, wherein the air blower is a centrifugal fan.

9. An air blowing device according to claim 7, wherein the duct device has a plurality of air intakes, a plurality of air discharge sections configured to blow air against a plurality of parts to be cooled, and a plurality of air ducts configured to conduct air taken in from the air intakes to the air discharge sections.

10. An air blowing device which blows cooling air against a part to be cooled comprising:
    a duct device having an air duct for conducting air from an air intake to an air discharge section and an air chamber formed downstream of the air discharge section in the air duct and configured such that cooling air blows from the air discharge section toward the part to be cooled, the air chamber being formed downstream of the air discharge section which is the furthest from the air intake; and
    an air blower configured to blow cooling air into the air intake.

* * * * *